United States Patent [19]

Dienst

[11] Patent Number: 4,940,329
[45] Date of Patent: Jul. 10, 1990

[54] DEGASSING EXTRUDER

[75] Inventor: Manfred Dienst, Burgdorf, Fed. Rep. of Germany

[73] Assignee: Hermann Berstorff Maschinenbau GmbH, Hanover, Fed. Rep. of Germany

[21] Appl. No.: 447,915

[22] Filed: Dec. 8, 1989

[30] Foreign Application Priority Data

Dec. 10, 1988 [DE] Fed. Rep. of Germany ....... 3841729

[51] Int. Cl.$^5$ .............................................. B29B 1/10
[52] U.S. Cl. .................................... 366/75; 366/82; 366/85; 366/90; 425/204; 425/208
[58] Field of Search ................. 366/69, 75, 76, 82, 366/83, 84, 85, 90, 318, 322, 324; 425/204, 208, 209

[56] References Cited

U.S. PATENT DOCUMENTS

| | | | |
|---|---|---|---|
| 3,608,868 | 9/1971 | Koch | 366/82 |
| 3,779,522 | 12/1973 | Loomans | 366/83 |
| 4,347,003 | 8/1982 | Anders | 366/75 |
| 4,423,960 | 1/1984 | Anders | 366/75 |
| 4,679,498 | 7/1987 | Chaveron et al. | 366/75 |
| 4,752,135 | 6/1988 | Loomans | 366/85 |
| 4,875,847 | 10/1989 | Wenger et al. | 425/204 |

*Primary Examiner*—Timothy F. Simone
*Attorney, Agent, or Firm*—Foley & Lardner, Schwartz, Jeffery, Schwaab, Mack, Blumenthal & Evans

[57] ABSTRACT

An extruder for degassing a thermoplastic plastics material melt comprises at least one screw mounted for rotation in a barrel. The barrel includes a first feed aperture for the introduction of the melt and a degassing port downstream thereof connectable to means for degassing the melt. The at least one screw is mounted on a shaft and has a helical flight. In the region of the port, the flight is replaced by alternating disc members and spacer members mounted on the shaft. The diameter or major dimension of the disc members corresponds substantially to the combined diameter of the screw core and its flight whilst the diameter of the spacer members corresponds to that of the screw core. The disc members have profiled downstream faces and the thickness of each disc member and each spacer member lies in the range of 0.1 to 0.5 times the diameter of the screw.

7 Claims, 3 Drawing Sheets

DEGASSING EXTRUDER

FIELD OF THE INVENTION

The present invention relates to an extruder. More particularly, the present invention relates to an extruder in which a fused plastics material can be degassed.

BACKGROUND OF THE INVENTION AND PRIOR ART DISCUSSION

A twin-screw degassing extruder is described in U.S. Pat. No. 4,423,960. In such arrangement, individual screw sections are mounted on a spindle. The screw sections are prevented from rotation relative to one another by key members which engage in a groove in the spindle.

The internal diameter of the barrel of the twin-screw extruder disclosed in this prior document is enlarged in the degassing region in order to obtain a greater free volume and hence to achieve better degassing of the plastics material melt.

These structural features do give good degassing results. On the other hand, the enlargement of the barrel in the degassing region is a very cost-intensive feature in the production of the barrels. This is because it is necessary to produce barrels and screw sections having enlarged diameters in the degassing region, which diameters differ from the respective diameters of the barrel and screw in the input region of the extruders.

In such known prior art extruders, the screw sections have helical flights disposed around their peripheries in the region below the degassing port. These flights occupy a large volume of the interior of the barrel. The conveying operation of an extruder is, in general, achieved by the adhesion of the melt to the interior wall of the barrel with substantially simultaneously the melt being scraped from the wall by the helical flights provided on the rotating screw. It is generally true to say that the better the material adheres to the interior wall of the barrel, the better the conveying effect of the helical flights of the screw.

However, since a considerable portion of the internal surface of the barrel, in which the material is being conveyed, is missing due to the provision of the degassing port, the conveyance of material is inadequate in the degassing region of such known degassing extruders. The material remains in the screw threads as a block or undergoes laminar flow without performing a rolling movement against the internal wall of the barrel if, as is necessary, part of the internal wall is absent as a result of the provision of the degassing port.

OBJECT OF THE INVENTION

The present invention seeks to provide a degassing extruder which achieves enhanced degassing without incurring excessively high costs in the construction and manufacture of the extruder. The invention also seeks to provide an extruder in which the degassing, even of plastics materials which are difficult to degas, such as highly viscous plastics materials or even elastomeric materials, is enhanced.

SUMMARY OF THE INVENTION

According to the present invention, there is provided an extruder for degassing viscous thermoplastic plastics material present in the form of a melt comprising at least one screw rotatably mounted on an axial shaft in a barrel, each screw including a helical flight disposed around a central core; a feed aperture for the plastics material and at least one degassing port formed in the barrel downstream of the feed aperture, the degassing port being connectable to atmosphere or to a vacuum-generating device, wherein the flight on each screw is discontinuous in the region of each degassing port, each shaft, in the region of each said degassing port, having a plurality of disc members mounted thereon, the disc members extending substantially parallel to one another and being spaced from one another by annular spacer discs, the disc members each having a downstream face which is profiled to produce a conveying effect in a downstream direction and each having a diameter corresponding substantially to the diameter of the combined screw core and flight in the flighted region of the screw, the diameter of the spacer members corresponding substantially to the core diameter of the screw section in the input region, the disc members having a thickness of from 0.1 to 0.5 times the diameter of the screw.

Preferably, two screws are provided, each mounted on a separate shaft, each shaft carrying, alternately in the direction of conveyance of the melt, disc members and spacer discs, wherein the disc members on one shaft intermesh with the disc members on the other shaft, the spacer discs on one shaft being aligned with the disc members on the other shaft.

In the case of twin-screw extruders, for example, the provision of disc members on the spindles below a degassing opening results in dwelling of the melt in the region the disc members on one screw spindle are offset or staggered in the working direction relative to the disc members on the other screw spindle.

The melt is conveyed across the backs of the disc members so that very thin layers of the melt, from which the gas bubbles can readily be removed by utilising a suction or vacuum device, are formed.

When the invention is used in twin-worm extruders, the staggered arrangement of the disc members and the spacer discs disposed therebetween on the screw spindles causes the melt to be conveyed in the working direction, across the back of each disc into the free space formed between a spacer disc associated with one screw and the internal wall of the barrel. The melt is conveyed, in a restrained manner, from this space into the next free space which is formed between a spacer disc associated with the other screw and the internal wall of the barrel. In other words, the melt is successively conveyed from one free space to the next, each pair of free spaces being substantially diametrically opposed to one another but being slightly offset or staggered in the major direction of conveyance. The melt thus dwells in the degassing region as a result of such restrained conveying action which enhances the degassing.

The melt may be spread out or broken up in the degassing region to form very thin layers by profiling formed on the downstream faces of the disc members. The profiling may be in the form of a toothed rim so that the degassing is further enhanced. The flow of melt is broken up and relayered again by each tooth, so that fine gas bubbles present in the melt are also broken up, and any gas, such as residual monomers, can escape. Excellent degassing results are achieved by virtue of this multiple relayering of the melt and by the increase in the dwell time of the melt in the degassing region, particularly in the case of highly viscous plastics materials and elastomers which are difficult to degas.

Desirably, the profiling of the disc members is in the form of semicircular grooves formed in the downstream surfaces of the disc members, which grooves extend axially with respect to the shaft on which the disc members are mounted.

Advantageously, the profiling of the disc members is in the form of inclined grooves of semicircular cross section formed in the downstream surfaces of the disc members.

Further preferably, the disc members are annular and are eccentrically mounted on the shaft associated therewith, such members scraping against the internal wall of the barrel during rotation.

Alternatively, the disc members are three-pointed, substantially triangular discs.

Further alternatively, the disc members are in the form of two-pointed substantially ellipsoid discs.

BRIEF DESCRIPTION OF THE DRAWINGS

Various embodiments of a degassing extruder in accordance with the present invention will be further described, by way of example, with reference to the accompanying drawings, in which.

DESCRIPTION OF PREFERRED EMBODIMENTS

Figure 1:
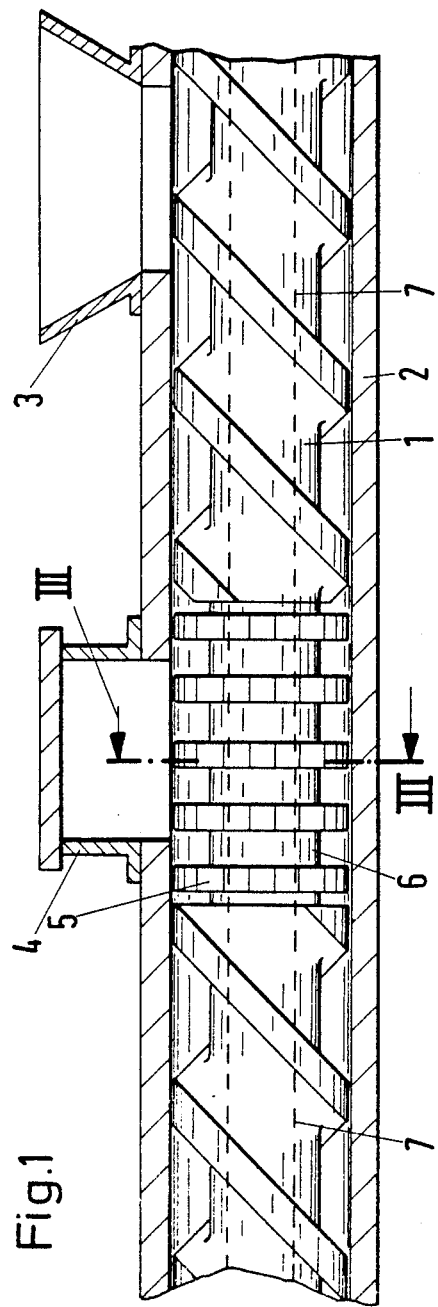
FIG. 1 is a vertical longitudinal section through a degassing extruder in accordance with the present invention and which comprises a single screw.

In FIG. 1 there is shown a single screw extruder which comprises a single screw 1 mounted for rotation in a barrel 2. A feed aperture 3 for the introduction of the material to be degassed and a degassing port 4 are provided in the barrel 2. The screw has, as is customary, a helical flight disposed around a central core.

Figure 4A:
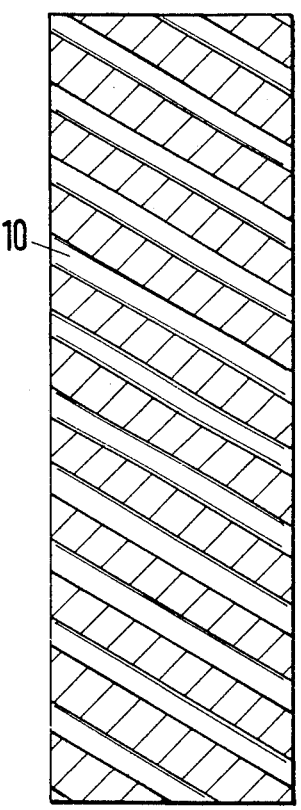
FIG. 4a is a development of the disc member shown in FIG. 4, with the teeth thereof extending obliquely with respect to the major axis of the screw.
Figure 4:
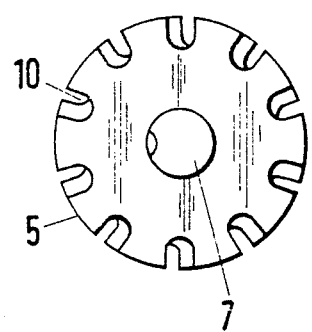
FIG. 4 is a cross-sectional view similar to that shown in FIG. 3, but of an alternative embodiment of a disc member.
Figure 5:
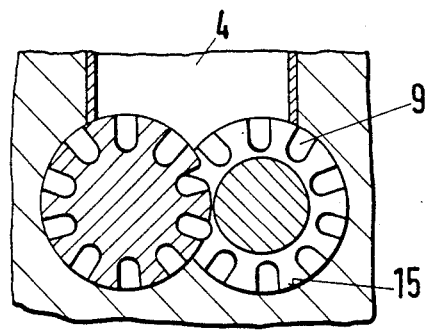
FIG. 5 is a cross-sectional view taken along the line V—V of FIG. 2.
Figure 6:
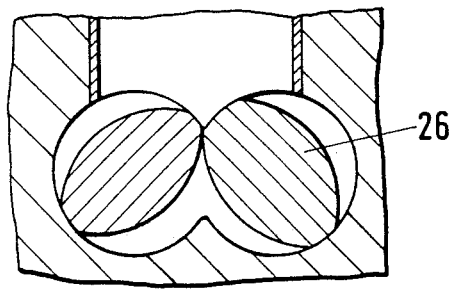
FIG. 6 and FIG. 7 show alternative forms of the disc members as shown in FIG. 5.

In the region thereof below the degassing port 4, the helical flight of the screw is replaced by a plurality of discs 5. These discs 5 may be produced either by milling a cylindrical spindle 7 or may be formed as individual discs 5 which are slipped onto the axially extending spindle 7. Circular spacer discs 6 are disposed between the pair of adjacent discs 5 located on the spindle 7. The discs may be circular in cross-section or angular, as is shown in FIGS. 3 and 6 or may have different shapes as shown in FIGS. 4 and 5.

Figure 2:
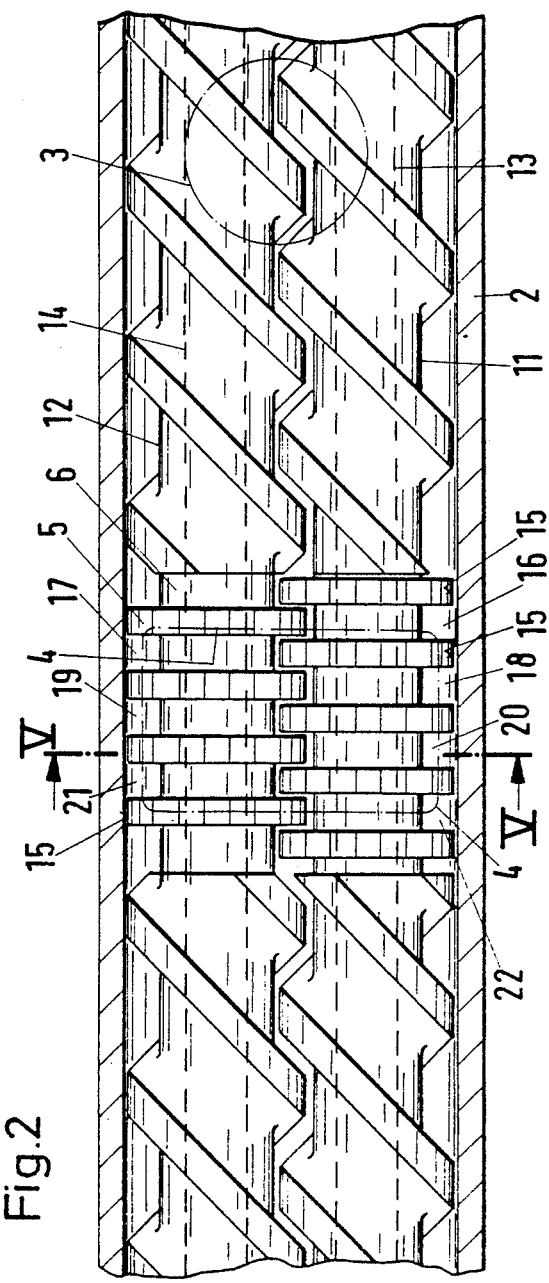
FIG. 2 is a horizontal longitudinal section through a degassing extruder in accordance with the present invention comprising twin screws.
Figure 3A:
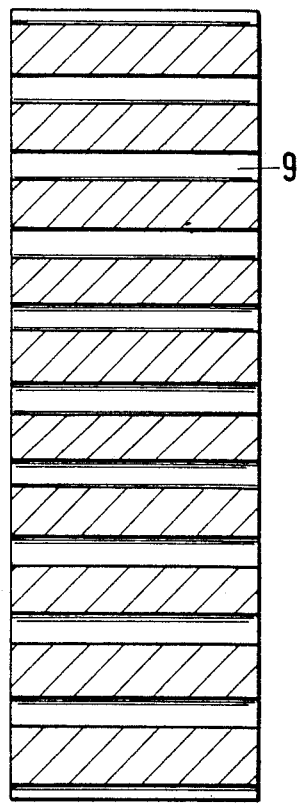
FIG. 3a is development of the disc member shown in FIG. 3, with the teeth thereof extending axially with respect to the major axis of the screw.
Figure 3:
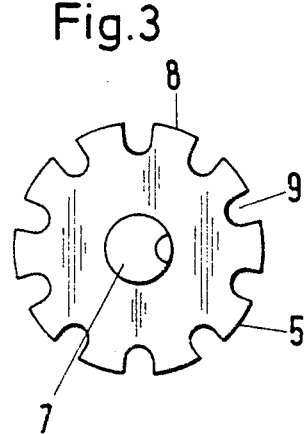
FIG. 3 is a cross-sectional view through a toothed disc, the view being taken along the line III—III of FIG. 1.

FIG. 3 is a cross-sectional view taken generally along the line III—III of FIG. 2. As shown in FIG. 3, the downstream faces 8 of the discs 5 have a profiling formed by the provision of axially extending grooves 9 formed around the periphery of the discs 5. The grooves 9 are extended axially with respect to the longitudinal axis of the screw as can be seen in the development shown in FIG. 3a. In the embodiment shown in FIGS. 1 and 2, the downstream faces of the discs 5 have obliquely extending grooves 10 which result in a conveying action being produced by the discs 5. These grooves 10 can be more clearly seen in FIGS. 4 and 4a.

FIG. 2 is a plan view of a twin-screw extrusion device in which two screws 11 and 12 are mounted in a barrel and are journalled to rotate in the same direction as one another. The screws 11 and 12 comprising individual parts mounted on spindles 13 and 14 respectively. Alternatively, the screws 11 and 12 could each also be made in one piece from a solid cylinder. In the FIG. 2 embodiment, discs 5 are again alternated with spacer discs 6 below the degassing port 4, as is the case in the FIG. 1 embodiment. Moreover, spaces are defined between the discs 5 and the spacer discs 6 in both embodiments but these are only referenced, as 16 to 22 inclusive, in FIG. 2. A plastics material in the form of a melt to be degassed is conveyed into the furthest upstream space 16 by the screw parts 11 and 12. The melt then flows into the succeeding space 17 which is disposed diametrically opposed to the space 16 but slightly offset downstream with respect thereto. The flow of the melt is caused by the pressure of the melt upstream. The melt strikes the backs of the discs and then enters the grooves 9 as shown in FIG. 5.

The melt then successively enters the spaces 18 to 22 inclusive through the respective grooves 9. Thus, the melt is conveyed from one peripheral region of the interior of the barrel to the opposed peripheral region whilst still having a component of downstream motion. It is therefore transferred from the screw disposed on the spindle 13 to the screw disposed on the spindle 14 and vice versa on a plurality of occasions so that very thin layers of melt are formed. Gaseous residual monomers can be removed in a very satisfactory manner from these layers. The axial grooves 9 perform a conveying action so that the melt is conveyed below the degassing port 4. The melt is continuously relayered and spread whereby the gas bubbles present therein are burst. The gas is drawn off through the degassing port by a known device acting on a vacuum principle.

The flow blockages which, in the prior art, are observed below a degassing port and which are caused by the absence of the interior surface of the barrel in the region of the degassing port are avoided. The conveyance of the melt is unexpectedly good as result of the construction, in accordance with the invention, of the screw sections below the degassing port 4. This is despite the fact the area of the degassing port inevitably means that a portion of the interior surface of the barrel is lost for the conveying operation. An increase in the output of the extrusion device of the present invention compared with prior art devices is achieved, particularly in the case of highly viscous plastics material melts. Moreover, the degassing effect is enhanced.

Figure 7:
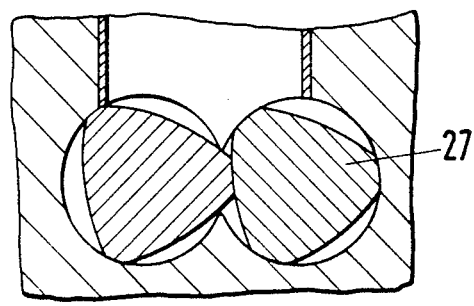
Figure 8:
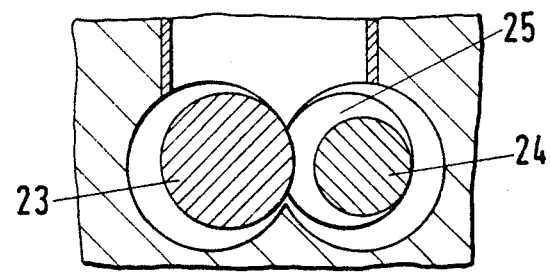
FIG. 8 shows eccentrically mounted circular disc members suitable for use in twin-screw extruders.

Further embodiments of the discs are shown in FIGS. 6 to 8. So-called two-point or ellipsoid discs 26 and three-point or substantially triangular discs 27 are shown in FIGS. 6 and 7 respectively. These contact one another during rotation and therefore have a high selfcleaning effect. The mixture being extruded is rolled out in thin layers, so that an enhanced degassing effect is achieved.

FIG. 8 shows circular discs 23, 24 similar to those shown in FIG. 5. In FIG. 8, however, the discs are eccentrically mounted on the screw spindles. A spacer disc 25 is disposed on the screw core 13 and is aligned with the disc 24 mounted on the adjacent screw core 14 so that a space 25 is formed therebetween. A plurality of such aligned discs and spacer discs are provided alternately on each core 13 and 14.

The spaces 25 are thus staggered relative to one another in a manner similar to the spaces 17 to 22 inclusive shown in FIG. 2 whereby the melt is advanced in the conveying direction by the screws rotating in the same direction. At the same time, a large number of thin layers of the mixture are formed which results in enhanced degassing.

In order to increase the conveying throughput of the two-point or three-point discs 26 and 27 respectively, their downstream faces may be provided with grooves extending obliquely to the axes of the screws.

A series of degassing tests were made utilising a polycarbonate plastics material as the melt to be degassed.

A twin-worm extruder, of the type shown in U.S. Pat. No. 4,423,960, which is known to exhibit better degassing properties than a conventional twin-worm extruder, was used in the first instance.

A polycarbonate containing 15% solvent was melted in such extruder. A polycarbonate melt is highly viscous, so that degassing is very difficult. The investigation of the polycarbonate carried out after degassing still showed a 2% solvent to be present, which must be considered to be an unsatisfactory result.

A similar polycarbonate was also fused and degassed in a comparison test utilising a twin-screw extruder constructed as shown in FIG. 2. Only 0.05% solvent was detected after the degassing. This value lies at the limit of detectability of solvents in polycarbonates and must, therefore, be considered to be an extremely satisfactory result. It must be emphasised that the twin-screw extruder used had screws and barrel of uniform diameters over their entire lengths. The extruder in accordance with the prior art specification and the extruder in accordance with the present invention were both operated at the same rotational speed of the screws, and the screws of both extruders had the same diameter in their intake regions.

I claim:

1. An extruder for degassing viscous thermoplastic plastics materials in the form of a melt comprising a barrel; at least one screw mounted for rotation with said barrel, shaft means mounting said at least one screw, said screw comprising core means mounted on said shaft and flight means helically disposed about the periphery of said core means, said barrel having a wall surface, said wall surface defining a first throughbore for the introduction of said plastics material into said barrel and a second throughbore downstream of said first throughbore for degassing said plastics material within said barrel, an intake and metering zone defined within said barrel between said first and said second throughbores and means for degassing said thermoplastic material communicating with the interior of said barrel through said second throughbore wherein said flight of each said screw is discontinuous in the region of said second throughbore; a plurality of disc members and spacer discs are alternately mounted on each said screw shaft in said region of said second throughbore, each said disc member and spacer disc having first and second opposed major surfaces, said first major surface being downstream of said second major surface, said first major surface of each said disc member defining profile means enhancing conveyance of said material in said downstream direction, each said disc member having a major dimension substantially equal to the overall diameter of said screw in said flighted region and each said spacer member having a major dimension substantially equal to the diameter of said screw core and wherein the thickness of each said disc member and spacer disc measured from said first major surface to said second major surface lies in the range of from 0.1 to 0.5 times said screw diameter.

2. An extruder as recited in claim 1 wherein first and second said screws are provided, said screws extending substantially axially parallel one to the other; said disc members on said first screw intermesh with said disc members on said second screw and said disc members on said first and second screws are aligned with said spacer discs on said second and first screws respectively.

3. An extruder as recited in claim 1 wherein said first major surface of each said disc member defines grooves of semi-circular cross-section, said grooves extending parallel to the major axis of said associated shaft.

4. An extruder as recited in claim 1 wherein said first major surface of each said disc member defines grooves of semi-circular cross-section, said grooves extending obliquely with respect to the major axis of said associated shaft.

5. An extruder as recited in claim 2 wherein said members have a substantially circular shape and are eccentrically mounted on said associated shaft.

6. An extruder as recited in claim 2 wherein said disc members have a two-pointed, substantially ellipsoid shape.

7. An extruder as recited in claim 2 wherein said disc members have a three-pointed, substantially triangular shape.

* * * * *